(12) United States Patent
Ai et al.

(10) Patent No.: US 9,360,045 B2
(45) Date of Patent: Jun. 7, 2016

(54) DOUBLE ROW TAPERED ROLLER THRUST BEARING FOR IMPROVED LOADING CAPACITY

(71) Applicant: The Timken Company, North Canton, OH (US)

(72) Inventors: Xiaolan Ai, Massillon, OH (US); Thomas L. Baker, North Canton, OH (US); Jesse R. Yorty, North Canton, OH (US); Stephen P. Johnson, North Canton, OH (US)

(73) Assignee: The Timken Company, North Canton, OH (US)

( * ) Notice: Subject to any disclaimer, the term of this patent is extended or adjusted under 35 U.S.C. 154(b) by 0 days.

(21) Appl. No.: 14/438,041

(22) PCT Filed: Jun. 24, 2014

(86) PCT No.: PCT/US2014/043840
§ 371 (c)(1),
(2) Date: Apr. 23, 2015

(87) PCT Pub. No.: WO2014/209982
PCT Pub. Date: Dec. 31, 2014

(65) Prior Publication Data
US 2015/0292553 A1    Oct. 15, 2015

Related U.S. Application Data

(60) Provisional application No. 61/839,451, filed on Jun. 26, 2013.

(51) Int. Cl.
*F16C 19/10*    (2006.01)
*F16C 19/30*    (2006.01)
(Continued)

(52) U.S. Cl.
CPC ............... *F16C 19/505* (2013.01); *B32B 5/00* (2013.01); *F16C 19/30* (2013.01); *F16C 19/305* (2013.01);
(Continued)

(58) Field of Classification Search
CPC ....... F16C 19/385; F16C 19/386; F16C 33/48; F16C 33/523; F16C 33/526
USPC .................................................... 384/608, 619
See application file for complete search history.

(56) References Cited

U.S. PATENT DOCUMENTS 625,021 A * 5/1899 Cooper .................. F16C 19/30
                                                    384/619
901,223 A * 10/1908 Barber .................. F16C 19/30
                                                    384/594
(Continued)

FOREIGN PATENT DOCUMENTS

JP    2006329219 A  * 12/2006
JP    2007270968 A    10/2007
(Continued)

OTHER PUBLICATIONS

International Search Report and Written Opinion for PCT Application No. PCT/US2014/043840 dated Nov. 26, 2014 (11 pages).

*Primary Examiner* — Phillip A Johnson
(74) *Attorney, Agent, or Firm* — Michael Best & Friedrich LLP (57) ABSTRACT

A double row thrust bearing assembly (10) includes a bottom plate (11) having inner and outer conical raceways (12, 13), a top plate (14) with a flat raceway (15), and respective sets of identically formed inner and outer rollers (16, 17) mounted on respective inner and outer cages (18, 19). When the bearing is fully assembled, the apices of the inner and outer rollers directed at the same point (A) on an axis (X) of the bearing. Various relationships with respect to the size and shapes of the rollers are determined in order to maximize the bearing assembly's load carrying capacity while occupying the same spatial envelope as that of a single row thrust bearing assembly (BA) which can only support a lesser load.

18 Claims, 5 Drawing Sheets

(51) Int. Cl.
*F16C 19/50* (2006.01)
*F16C 19/38* (2006.01)
*F16C 33/36* (2006.01)
*F16C 33/48* (2006.01)
*F16C 33/52* (2006.01)
*F16C 33/58* (2006.01)
*B32B 5/00* (2006.01)

(52) U.S. Cl.
CPC ............. *F16C 19/385* (2013.01); *F16C 33/366* (2013.01); *F16C 33/48* (2013.01); *F16C 33/523* (2013.01); *F16C 33/585* (2013.01); *B23B 2215/12* (2013.01); *F16C 2240/34* (2013.01); *F16C 2240/70* (2013.01); *F16C 2240/80* (2013.01)

(56) References Cited

U.S. PATENT DOCUMENTS

| | | | | |
|---|---|---|---|---|
| 1,191,862 | A | * | 7/1916 | Williams ................ F16C 19/30 384/594 |
| 1,397,142 | A | * | 11/1921 | Palmgren ................ F16C 19/30 29/898.063 |
| 3,556,618 | A | | 1/1971 | Toth |

FOREIGN PATENT DOCUMENTS

| | | |
|---|---|---|
| RU | 2384764 | 3/2010 |
| SU | 183544 | 8/1966 |
| WO | 2014209982 A1 | 12/2014 |

\* cited by examiner

DOUBLE ROW TAPERED ROLLER THRUST BEARING FOR IMPROVED LOADING CAPACITY

CROSS-REFERENCE TO RELATED APPLICATIONS

The present application claims the benefit of U.S. provisional patent application No. 61/839,451 entitled "Double Row Tapered Roller Thrust Bearing for Improved Loading Capacity" filed Jun. 26, 2013, which is incorporated herein by reference in its entirety.

BACKGROUND

This disclosure relates to double row thrust bearings; and, more particularly, to double row tapered roller thrust bearings having an increased load capacity without a concomitant increase in the size of the bearing.

The increasing demand for power density in mechanical systems often requires a rolling element bearing to support increased loads while occupying the same, and in some instances, a smaller space. For example, in the oil and gas industry, the thrust load on a top drive assembly has increased 20%; while, at the same time, the envelope size for the supporting bearing has remained the same. Doing so has made it possible to avoid redesign of the drive system. Because of this and similar situations, bearing makers are now challenged to meet this new demand of developing new bearings having an improved load carrying capacity while still fitting within the same space as previous bearings having less load carrying capacity.

Figure 1:
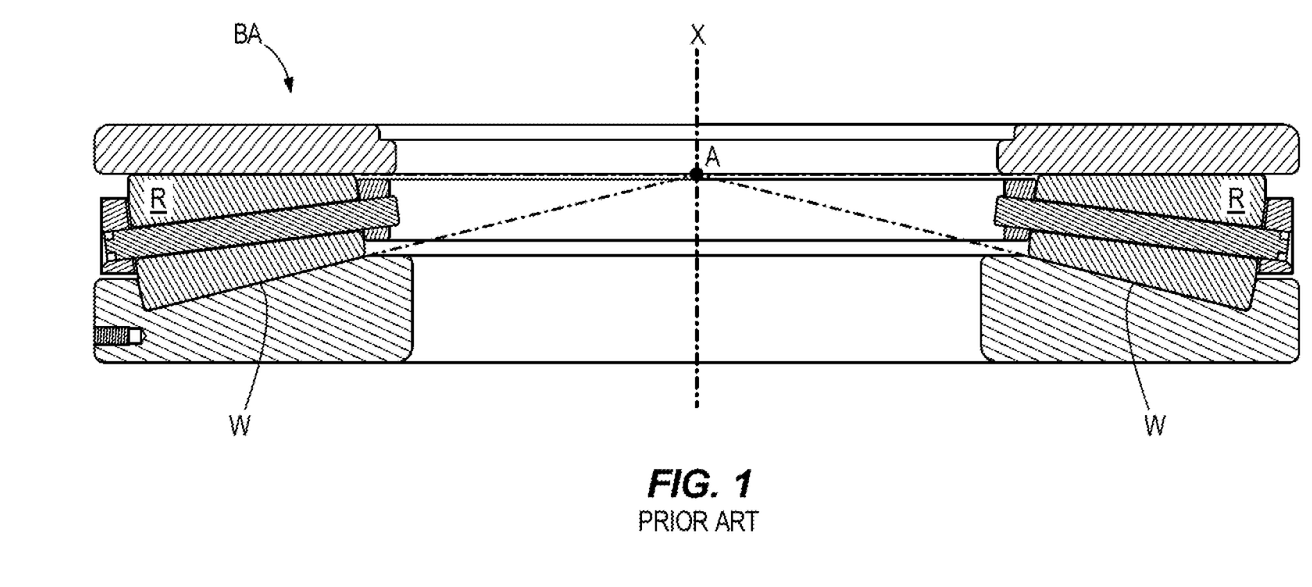
FIG. 1 is a sectional view of a prior art single row thrust bearing assembly.

Thrust roller bearings have higher axial load carrying capacities than their ball bearing counterparts. Further, tapered roller thrust bearings are often favored over cylindrical thrust bearings because of the essentially pure rolling motions between a roller body (i.e., rolling element) and its raceway contacts. This pure rolling motion results from the so-called "on apex" design as illustrated in FIG. 1. In an on-apex design, the diameter of a rolling element (roller) R tapers down towards the apex A of a single row thrust bearing assembly BA. This results in a reduced effective contact radius as the area of contact between roller R and its raceway W moves closer to the bearing's axis X. This, in turn, has a negative impact on the bearing's load carrying capacity. The present disclosure is directed to a novel design which overcomes this deficiency of single row thrust tapered roller bearings. Previous attempts at increasing the load bearing capacity of a double row thrust bearing assembly have been made. See, for example, Japanese patent publication 2007270968A which employs both needle rollers and tapered rollers.

SUMMARY

The present disclosure is directed to a double row thrust bearing assembly which occupies the same spatial envelope as a single row thrust bearing assembly which can only support a lesser load. The assembly includes a bottom plate with inner and outer conical raceways, a top plate with a flat raceway, a set of identically formed inner rollers and a set of identically formed outer rollers. The assembly may further include an inner cage to separate the rollers forming the set of inner rollers and an outer cage to separate the rollers forming the set of outer rollers. When the bearing is fully assembled, the apices of the respective inner and outer rollers are directed at the same point on an axis of the bearing.

Various relationships with respect to the size and shapes of the rollers are used to maximize the bearing assembly's load carrying capacity.

A bearing assembly made in accordance with the present disclosure has an increased load carrying capacity as compared to that of a single row thrust bearing assembly even though the double row thrust bearing assembly occupies the same envelope as the single row thrust bearing assembly.

The result is bearing assembly which does not have to be made larger in order to support greater loads to which it is subjected.

Other objects and features will be in part apparent and in part pointed out hereinafter.

DETAILED DESCRIPTION

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Figure 2:
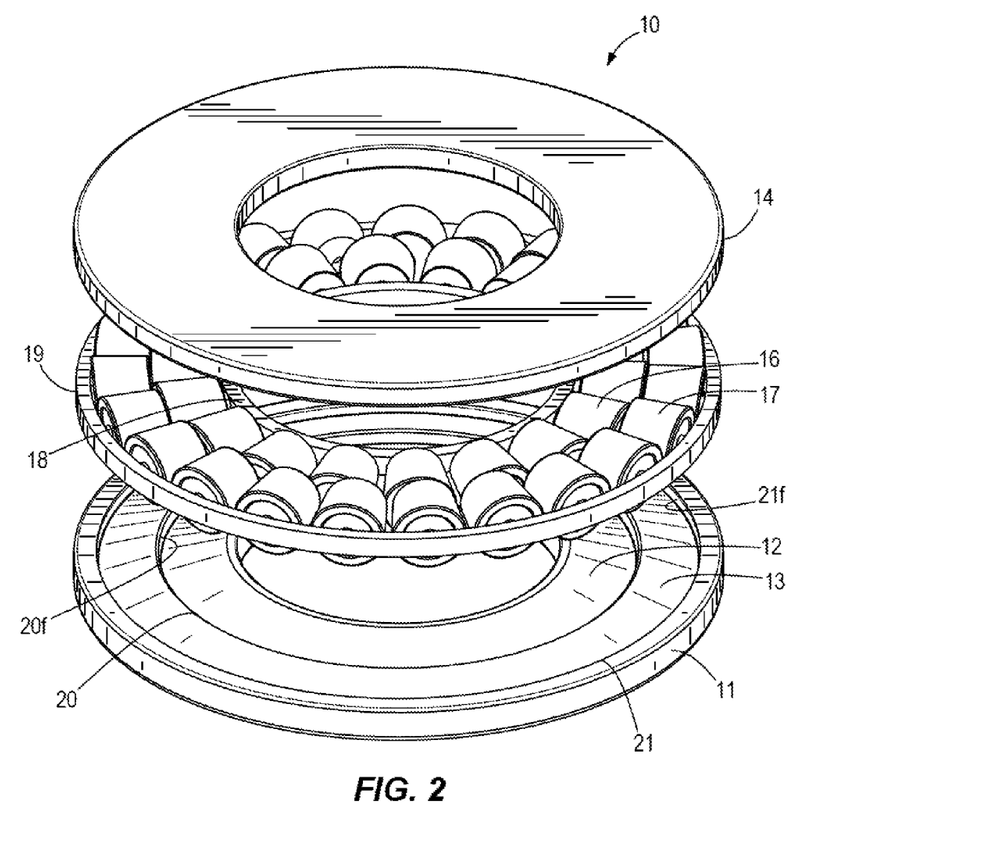
FIG. 2 is an exploded, perspective view of a double row thrust bearing assembly of the present disclosure.
Figure 3:
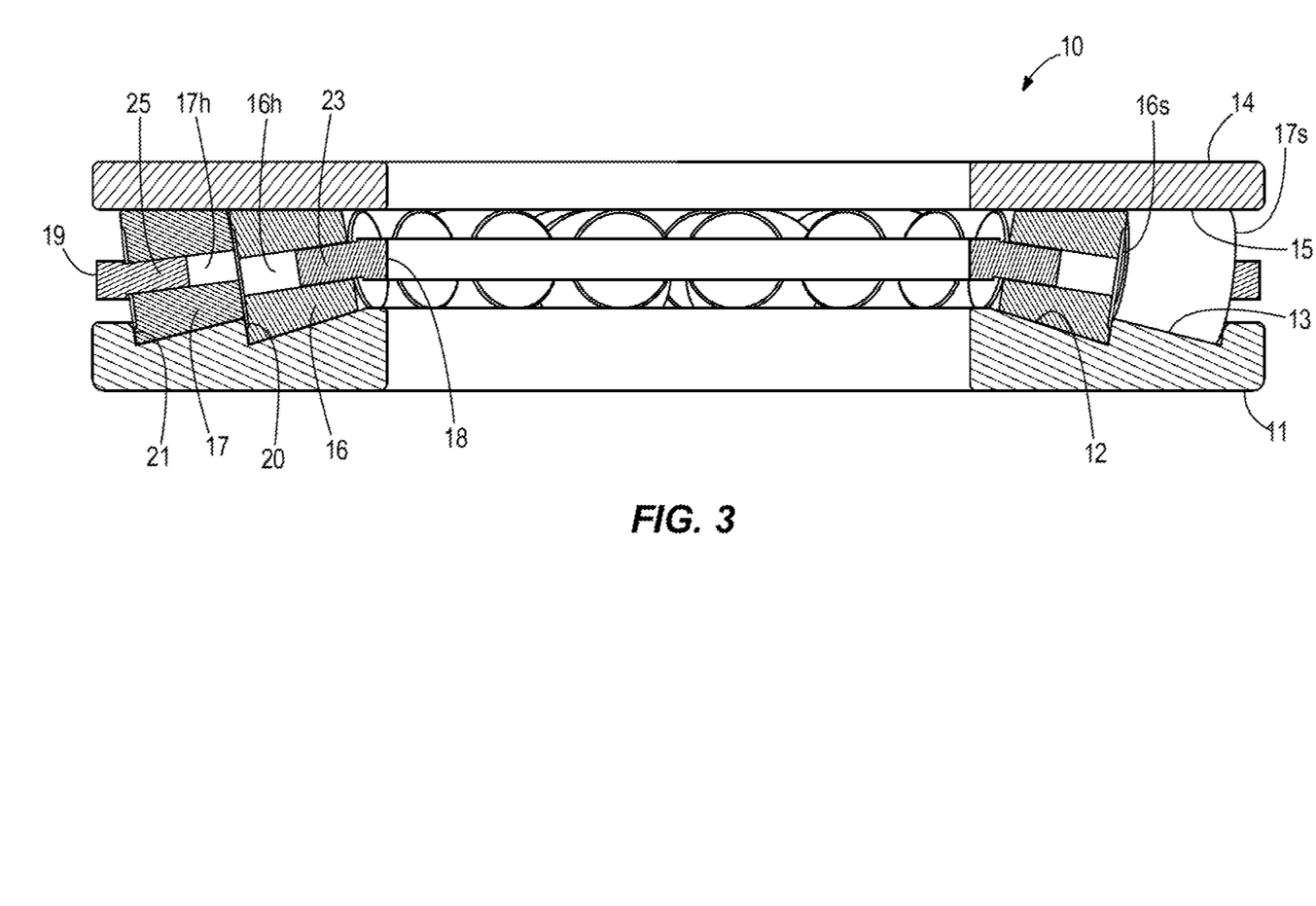
FIG. 3 is a cross-sectional view of the double row thrust bearing assembly.

Referring to FIGS. 2 and 3, an embodiment of a double-row tapered roller thrust bearing is indicated generally 10. Bearing 10 comprises a bottom plate 11 having an inner and outer conical raceway 12 and 13 respectively, a top plate 14 having a flat raceway 15, a set of identically formed inner rollers or rolling elements 16, and a set of identically formed outer rollers or rolling elements 17. The inner and outer sets of rollers are concentrically arranged in assembly 10. The inner rollers 16 are separated by an annular inner cage 18 (see FIG. 4) and are arranged on inner raceway 12. The outer rollers 17 are separated by an annular outer cage 19 (see FIG. 5) and are arranged on outer raceway 13.

Inner and outer rollers 16, 17 are tapered rollers with each roller having a tapered body. The large end of each roller is larger in diameter than the small end thereof with the outer end of each roller being a spherical outer end 16s, 17s respectively (see FIG. 3). Bottom plate 11 includes an inner rib 20 and an outer rib 21. As shown in FIG. 2, inner rib 20 has a conical face 20f on which the spherical roller end of each inner roller 16 sits. As also shown in FIG. 2, outer rib 21 has a conical rib face 21f on which the spherical roller end of each outer roller 17 sits. Both inner rollers 16 and outer rollers 17 have center holes (16h and 17h respectively, see FIG. 3) for receiving cylindrical pins 23 and 25 respectively extending from the respective inner and outer cages 18, 19.

Figure 4:
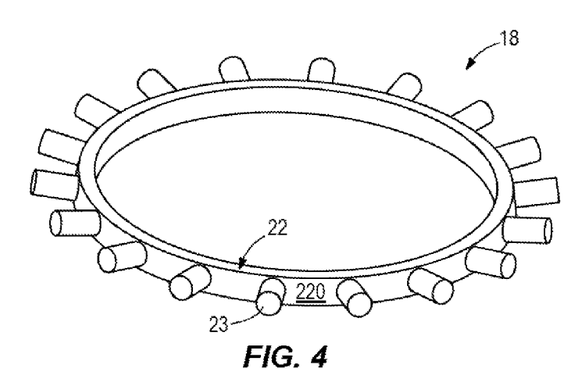
FIG. 4 is a perspective view of an inner cage of the assembly.
Figure 5:
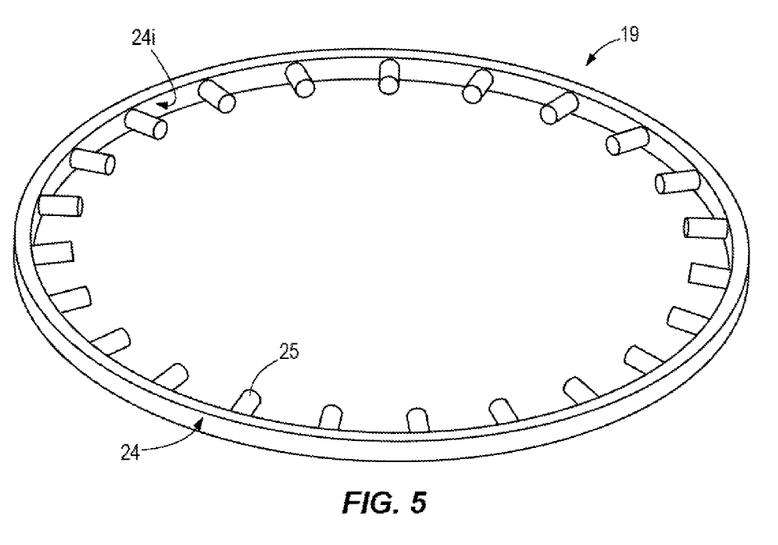
FIG. 5 is a perspective view of an outer cage of the assembly.

As shown in FIG. 4, inner cage 18 has a base ring 22 with a plurality of pin shafts 23 extending radially outwardly from an outer face 22o of the base ring. Each pin shaft 23 mates with an inner roller 16 at the rollers' small, inner end. As shown in FIG. 5, outer cage 19 has a base ring 24 with a plurality of pin shafts 25 extending radially inwardly from an inner face 24i of the base ring. Each pin shaft 25 mates with an outer roller 17 at the rollers' large end.

Figure 6:
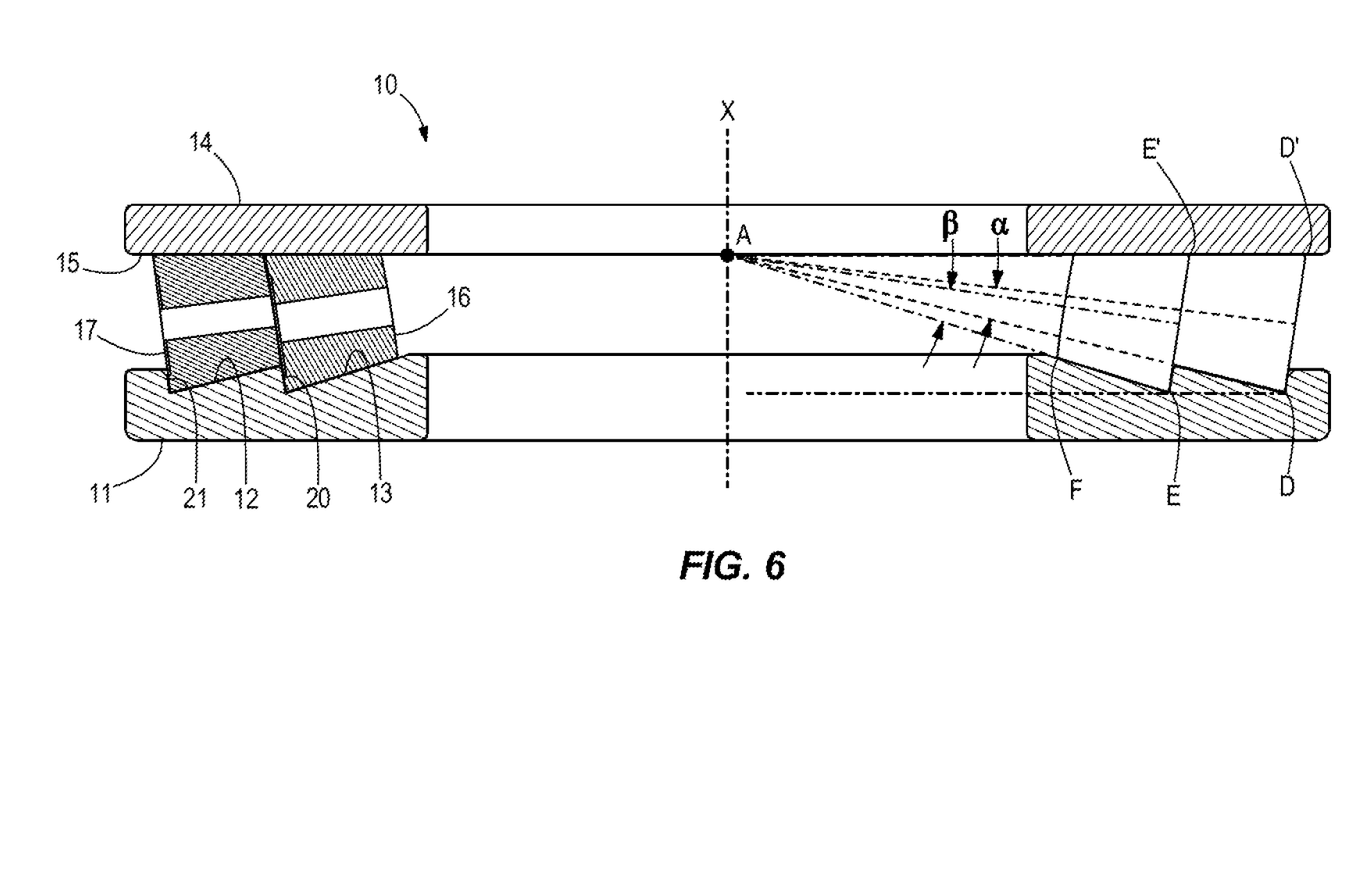
FIG. 6 is a cross-sectional view similar to FIG. 3 and illustrating various parameters used to maximize the load carrying capacity of a double row thrust bearing assembly.

When bearing 10 is fully assembled as shown in FIG. 6, the apices of inner rollers 16 and outer rollers 17 are directed at essentially the same point A on axis X of the bearing.

Referring to the right half of FIG. 6, to maximize bearing 10's load carrying capacity, the following relationship is recommended $$\frac{D_i}{D_o} \geq \frac{\cos\alpha}{\cos\beta} \tag{1}$$

where $D_i=EE'$ is the roller diameter at the large end of inner rollers 16, $D_o=DD'$ is the roller diameter at the large end of outer rollers 17, $\alpha$ is the half included angle for the outer rollers and $\beta$ is the half included angle for the inner rollers (see FIG. 6). As will be appreciated by those skilled in the art, the roller diameter for an inner roller 16 is not less than that for the outer rollers 17. Next, a roller's aspect ratio can be defined as the roller's effective length divided by the diameter of its larger end. Accordingly, the aspect ratios for the inner and outer rollers are expressed as $$\rho_i = \frac{l_i}{D_i}; \rho_o = \frac{l_o}{D_o}$$

where $l_i$ and $l_o$ are the effective roller lengths for the inner and outer rollers respectively. For geometry and load capacity considerations, the roller aspect ratio $\rho_o$ for outer rollers 17 is chosen in accordance with the following relationship:

$$0 < \rho_o \ll \frac{1}{2\sin\alpha}\left(1 - \frac{\sin 2\alpha}{\sin 2\beta}\right) \tag{2}$$

The aspect ratio $\rho_o$ for the outer roller is also chosen with respect to the aspect ratio of the inner rollers $\rho_i$, the number of rollers $Z_i$ for the inner rollers 16, and the number $Z_o$ of rollers for the outer rollers 17; such that, the following inequality is met $$1 \geq \left(\frac{Z_i}{Z_o}\right)^{3/4} \geq \frac{\rho^{7/9}(1-\rho\cdot\sin\alpha)^{29/27} - \rho_o^{7/9}(1-\rho_o\cdot\sin\alpha)^{29/27}}{(\rho-\rho_o)^{7/9}\left[\frac{\cos\alpha}{\cos\beta}-(\rho-\rho_o)\cdot\sin\beta\right]^{29/27}} \tag{3}$$

where $$\rho = \left(\frac{\cos\alpha}{\cos\beta}\right)\rho_i + \rho_o$$

The number of rollers $Z_i$ for the inner rollers is less than the number $Z_o$ for the outer rollers. To maximize the load carrying capacity of a double row tapered roller thrust bearing 10, it is desirable to maximize the following function F, $$F = \left(\frac{Z_i}{Z_o}\right)^{3/4} - \frac{\rho^{7/9}(1-\rho\cdot\sin\alpha)^{29/27} - \rho_o^{7/9}(1-\rho_o\cdot\sin\alpha)^{29/27}}{(\rho-\rho_o)^{7/9}\left[\frac{\cos\alpha}{\cos\beta}-(\rho-\rho_o)\cdot\sin\beta\right]^{29/27}} \tag{4}$$

For practical considerations, the following geometrical relationships are recommended $$D_i = \left(\frac{\cos\alpha}{\cos\beta}\right)D_o \tag{5}$$

$$\rho_o = \frac{1}{2\sin\alpha}\left(1 - \frac{\sin 2\alpha}{\sin 2\beta}\right) \tag{6}$$

$$\rho_i = (\rho - \rho_o)\left(\frac{\cos\beta}{\cos\alpha}\right) \tag{7}$$

where $\alpha$, $D_o$, $\rho$, and $Z_o$ are independent variables, whose values can be taken from a corresponding single row thrust tapered roller bearing (not shown) having a similar spatial envelope; $\beta$, $D_i$, $\rho_o$, $\rho_i$ and $Z_i$ are dependent values whose values are determined such that F in equation (4) is maximized and the relationships set forth in equations (5)-(7) are met.

In practice, maximization of F can be carried out iteratively by maximizing the first term in equation (4) while, at the same time, minimizing the second term in this equation. The former yields $Z_i$ and the latter, together with equation (6), yields $\beta$. The other parameters ($D_i$, $\rho_o$, $\rho_i$) are then obtained using equations (5)-(7).

Those skilled in the art will understand that multi-row (three or more rows) tapered roller thrust bearings can be constructed using the same design format and following similar design and analysis techniques as used to produce double-row bearing 10.

It will be understood by those skilled in the art that bearing 10 can be a full complementary bearing; in which instance, no cages are required. Further, the rollers may have a layer of coating to minimize friction during possible roller-to-roller contacts.

Those skilled in the art will understand that the multi-row tapered roller thrust bearing 10 can be produced through various manufacturing methods. One manufacturing method involves forging, heat treatment, and then hard turning. The raceways 12, 13, and 15 and ribs 20, 21 will be made through a turning operation after heat treated for proper surface hardness. Macro profiles as well as micro profiles can be put on the raceways 12, 13, and 15 to reduce contact stresses. The turning operation can be carried out in a computer numerical controlled turning machine (CNC) for greater accuracy and consistency. Then, the raceways 12, 13, and 15 can be subsequently honed after the hard turning operation to further improve surface finishes.

Various features and advantages of the invention are set forth in the following claims.

What is claimed is:
1. A double row thrust bearing assembly comprising:
   a bottom plate having inner and outer conical raceways;
   a top plate having a flat raceway;
   respective sets of inner and outer rollers in which the largest diameter of the inner rollers is not less than the largest diameter of the outer rollers, and in which said inner and outer rollers are tapered rollers with an outer end of each roller being larger in diameter than an inner end thereof; and, when the bearing is fully assembled, the apices of the inner and outer rollers are directed at the same point on an axis of the bearing assembly;

wherein the load carrying capacity of the bearing assembly is maximized in accordance with the equation $$\frac{D_i}{D_o} \geq \frac{\cos\alpha}{\cos\beta}$$

which defines the relationship of the diameters between the inner and outer rollers and in which $D_i$=EE' is the roller diameter at a large end of said inner rollers, $D_o$=DD' is the roller diameter at a large end of said outer rollers, $\alpha$ is a half included angle for the outer rollers, and $\beta$ is a half included angle for the inner rollers.

2. The double row thrust bearing assembly of claim 1 further including an inner cage in which the rollers comprising the inner set of rollers are mounted and an outer cage in which the rollers comprising the outer set of rollers are mounted.

3. The double row thrust bearing assembly of claim 1 in which the aspect ratios for the inner and outer rollers are expressed as $$\rho_i = \frac{l_i}{D_i};$$

$$\rho_o = \frac{l_o}{D_o}$$

where $l_i$ and $l_o$ are the effective roller lengths for the respective inner and outer rollers with the aspect ratio $\rho_o$ for said outer rollers is chosen in accordance with the following relationship:

$$0 < \rho_o \ll \frac{1}{2\sin\alpha}\left(1 - \frac{\sin 2\alpha}{\sin 2\beta}\right).$$

4. The double row thrust bearing assembly of claim 3 in which the aspect ratio $\rho_o$ for the outer roller is further chosen with respect to the aspect ratio of the inner rollers $\rho_i$, the number of rollers $Z_i$ comprising the set of inner rollers, and the number of rollers $Z_o$ comprising the set of outer rollers; such that, the following inequality is met $$1 \geq \left(\frac{Z_i}{Z_o}\right)^{3/4} \geq \frac{\rho^{7/9}(1-\rho\cdot\sin\alpha)^{29/27} - \rho_o^{7/9}(1-\rho_o\cdot\sin\alpha)^{29/27}}{(\rho-\rho_o)^{7/9}\left[\frac{\cos\alpha}{\cos\beta} - (\rho-\rho_o)\cdot\sin\beta\right]^{29/27}}$$

where $$\rho = \left(\frac{\cos\alpha}{\cos\beta}\right)\rho_i + \rho_o.$$

5. The double row thrust bearing assembly of claim 4 in which the number of rollers $Z_i$ comprising the set of inner rollers is less than the number of rollers $Z_o$ comprising the set of outer rollers.

6. The double row thrust bearing assembly of claim 5 in which maximizing the load carrying capacity of the double row tapered roller thrust bearing requires maximizing the following function F, $$F = \left(\frac{Z_i}{Z_o}\right)^{3/4} - \frac{\rho^{7/9}(1-\rho\cdot\sin\alpha)^{29/27} - \rho_o^{7/9}(1-\rho_o\cdot\sin\alpha)^{29/27}}{(\rho-\rho_o)^{7/9}\left[\frac{\cos\alpha}{\cos\beta} - (\rho-\rho_o)\cdot\sin\beta\right]^{29/27}}.$$

7. The double row thrust bearing assembly of claim 6 further including the following geometrical relationships:

$$D_i = \left(\frac{\cos\alpha}{\cos\beta}\right)D_o;$$

$$\rho_o = \frac{1}{2\sin\alpha}\left(1 - \frac{\sin 2\alpha}{\sin 2\beta}\right);$$

and $$\rho_i = (\rho - \rho_o)\left(\frac{\cos\beta}{\cos\alpha}\right),$$

where $\alpha$, $D_o$, $\rho$, and $Z_o$ are independent variables whose values are derived with respect to a corresponding single row thrust tapered roller bearing having a similar spatial envelope.

8. The double row thrust bearing assembly of claim 7 wherein the value of F is maximized by iteratively maximizing the first term in the equation for F while, at the same time, minimizing the second term in the equation; the first term in the equation for F producing a value for $Z_i$ and the latter term in the equation, together with the equation in claim 7 for $\rho_o$ produces a value for $\beta$, and values for the parameters $D_i$, $\rho_o$, and $\rho_i$ being obtained using the respective equations set forth in claim 7 for these parameters.

9. A method of maximizing the load carrying capacity of double row thrust bearing assembly occupying a similar spatial envelope to that of a single row thrust bearing assembly, the double row thrust bearing assembly including a bottom plate having inner and outer conical raceways, a top plate having a flat raceway, and respective sets of inner and outer tapered rollers mounted on respective inner and outer cages of the double row thrust bearing assembly with the apices of the inner and outer rollers being directed at the same point on an axis thereof, maximization of the load carrying capacity being determined in accordance with the equation $$\frac{D_i}{D_o} \geq \frac{\cos\alpha}{\cos\beta}$$

which defines the relationship of the diameters between the inner and outer rollers and in which $D_i$=EE' is the roller diameter at a large end of said inner rollers, $D_o$=DD' is the roller diameter at a large end of said outer rollers, $\alpha$ is a half included angle for the outer rollers, and $\beta$ is a half included angle for the inner rollers.

10. The method of claim 9 in which the aspect ratios for the inner and outer rollers are expressed as $$\rho_i = \frac{l_i}{D_i};$$

$$\rho_o = \frac{l_o}{D_o}$$

where $l_i$ and $l_o$ are the effective roller lengths for the respective inner and outer rollers with the aspect ratio $\rho_o$ for said outer rollers is chosen in accordance with the following relationship.

$$0 < \rho_o \ll \frac{1}{2\sin\alpha}\left(1 - \frac{\sin 2\alpha}{\sin 2\beta}\right).$$

11. The method of claim 10 in which the aspect ratio $\rho_o$ for the outer roller is further chosen with respect to the aspect ratio of the inner rollers $\rho_i$, the number of rollers $Z_i$ comprising the set of inner rollers, and the number of rollers $Z_o$ comprising the set of outer rollers; such that, the following inequality is met $$1 \geq \left(\frac{Z_i}{Z_o}\right)^{3/4} \geq \frac{\rho^{7/9}(1 - \rho \cdot \sin\alpha)^{29/27} - \rho_o^{7/9}(1 - \rho_o \cdot \sin\alpha)^{29/27}}{(\rho - \rho_o)^{7/9}\left[\frac{\cos\alpha}{\cos\beta} - (\rho - \rho_o) \cdot \sin\beta\right]^{29/27}}$$

where $$\rho = \left(\frac{\cos\alpha}{\cos\beta}\right)\rho_i + \rho_o.$$

12. The method of claim 11 in which the number of rollers $Z_i$ comprising the set of inner rollers is less than the number of rollers $Z_o$ comprising the set of outer rollers and maximizing the load carrying capacity of the double row tapered roller thrust bearing requires maximizing the following function F, $$F = \left(\frac{Z_i}{Z_o}\right)^{3/4} - \frac{\rho^{7/9}(1 - \rho \cdot \sin\alpha)^{29/27} - \rho_o^{7/9}(1 - \rho_o \cdot \sin\alpha)^{29/27}}{(\rho - \rho_o)^{7/9}\left[\frac{\cos\alpha}{\cos\beta} - (\rho - \rho_o) \cdot \sin\beta\right]^{29/27}}.$$

13. The method of claim 12 further including the following geometrical relationships:

$$D_i = \left(\frac{\cos\alpha}{\cos\beta}\right)D_o;$$

$$\rho_o = \frac{1}{2\sin\alpha}\left(1 - \frac{\sin 2\alpha}{\sin 2\beta}\right);$$

and $$\rho_i = (\rho - \rho_o)\left(\frac{\cos\beta}{\cos\alpha}\right),$$

where $\alpha$, $D_o$, $\rho$, and $Z_o$ are independent variables whose values are derived with respect to a corresponding single row thrust tapered roller bearing having a similar spatial envelope.

14. The method of claim 13 wherein the value of F is maximized by iteratively maximizing the first term in the equation for F while, at the same time, minimizing the second term in the equation; the first term in the equation for F producing a value for Zi and the latter term in the equation, together with the equation in claim 13 for $\rho_o$ produces a value for $\beta$, and values for the other parameters $D_i$, $\rho_o$, and $\rho_i$ being obtained using the respective equations set forth in claim 13 for these parameters.

15. The method of claim 9 in which the rollers comprising the respective sets of inner and outer rollers are formed with identical effective lengths.

16. The method of claim 9 wherein at least one of the inner conical raceway, the outer conical raceway, and the flat raceway are formed by hard turning a heat treated surface.

17. The method of claim 16 wherein the hard turning is carried out in a computer numerical controlled turning machine.

18. The method of claim 16 further including honing the hard turned raceways.

* * * * *